Oct. 6, 1970

3,533,015

Original Filed July 3, 1964

INVENTOR
RALPH F. WUERKER

BY
Benjamin DeWitt
ATTORNEY

INVENTOR
RALPH F. WUERKER
ATTORNEY

United States Patent Office 3,533,015
Patented Oct. 6, 1970

3,533,015
RADIATION BEAM DIRECTING SYSTEMS
Ralph F. Wuerker, Palos Verdes Estates, Calif., assignor to TRW Inc., a corporation of Ohio
Continuation of application Ser. No. 380,146, July 3, 1964. This application May 31, 1968, Ser. No. 740,776
Int. Cl. A01s 3/00; G02f 1/28
U.S. Cl. 331—94.5
5 Claims

ABSTRACT OF THE DISCLOSURE

In one preferred embodiment of the invention, an angular radiation beam directing system uses an activated light amplifying means, such as a cylindrical ruby rod which is disposed within an optical frequency resonant cavity having optically flat reflectors defining the cavity. An electro-optically controllable directional filter means is disposed within the cavity for directing a parallel beam of light through the light amplifying means at a desired angle. A pair of identical lenses are positioned between the light amplifying means and each of the flat reflectors. The lenses are spaced a distance equal to their focal length from the reflectors. This particular placement of the lenses makes the optical resonant cavity omnidirectional over an angular range.

---

This is a continuation of application Ser. No. 380,146, filed July 3, 1964, and now abandoned.

This invention relates to systems for angularly directing a radiation beam and more particularly to improvements in systems of the general type disclosed in the copending patent application of F. R. Marshall, Ser. No. 343,623, filed Feb. 10, 1964, and assigned to the same assignee as the present invention.

In the prior art, various types of so-called laser oscillators have been developed which operate in the optical and infrared frequency ranges. For the purposes of the present application, the expression "light frequency radiation" is intended to define the electromagnetic band from the farthest infrared to the ultraviolet and encompassing general wavelength range from about $2 \times 10^4$ angstroms to about 200 angstroms. The term "light" as used in the present application is to be understood as meaning electromagnetic radiation having substantially any wavelength within that range.

Since the advent of laser systems for generating coherent radiation, the problem of high speed light beam deflection has become one of the great challenges of the physical sciences. Heretofore, a number of workers in the art have attacked the problem of light beam deflection by providing variably refractive optical elements in arrangements which deflect the light beam from its original direction or original axis. In such systems, the light source normally provides a bundle of rays or a wave normal which is in a fixed direction and the effort has been to deflect or bend the beam by apparatus which is separate and divisible from the mechanism, such as a laser, which generates the light. One such prior art beam deflection system has been described in a paper entitled, "The Problem of Light Beam Deflection at High Frequencies," read by Uwe J. Schmidt at the Symposium of Optical Processing of Information, Washington, D.C., 1963, (Spentan Books). The present invention takes a new approach to the problem of angular beam scanning or beam positioning. Very briefly, rather than generating a beam along a fixed axis and thereafter bending it, the present invention preselects or variably controls the direction along which a laser system generates its output beam. The specific direction along which beam generation occurs at a given point in time is governed by spatially distributed filter means positioned within an optical resonator. In the above mentioned copending application, there is disclosed one form of apparatus in which the direction of oscillation or of maximum regeneration of a laser system is determined and controlled by electrically variable filter means inside the resonant cavity of a laser. More specifically in one particular embodiment of that copending application, a cavity resonator is formed by a pair of concentric spherical mirrors between which is positioned a light amplifying means in the form of a laser element having spherical end surfaces which are concentric with the mirror elements. That arrangement provides a resonant system which is omnidirectional over a fairly large solid angular range in the sense that a beam-like mode of optical frequency oscillation can be generated in substantially any direction within that solid angle. While the apparatus of the above mentioned copending application as just described is operative and satisfactory for some purposes it has the distinct disadvantage that all oscillation tends to occur along lines which are diameters of the concentric cavity. That is, along lines which pass through the common center of the spherically symmetrical system. When a solid state lasing material such as chromium doped corundum (pink ruby) is used in that above described arrangement, relatively poor efficiency results from the fact that oscillation occurs through only a relatively small portion of the solid state material and, therefore, stimulated emission is not obtained from the remaining portions of the solid state laser. This means that a considerable portion of the laser rod is required to be pumped but does not contribute to the output beam energy. The present invention overcomes the foregoing difficulties by providing an omnidirectional resonant cavity arrangement which is not formed of concentric spherical elements and in which it is possible to support optical frequency oscillation in the form of light rays travelling along a multiplicity of spaced parallel paths back and forth through the population density inversionable medium. This enables a very considerable increase in the volume of the active medium which contributes energy to the output beam by way of stimulated emission and therefore provides a substantial increase in efficiency as compared to the arrangements disclosed in the above mentioned copending application.

Accordingly, it is a primary object of the present invention to provide a system for generating a light beam which system enables preselection of substantially any desired beam direction within a predetermined angular range, and which avoids one or more of the disadvantages of the prior art systems.

It is another object of the invention to provide a coherent radiation beam producing system in which the angular direction of coherent oscillation and beam propagation is selectively determinable and controllable and in which improved efficiency of utilization of energy stored in the quantum mechanically active portions of the system is achieved.

It is a further object of the present invention to provide a light beam producing system which achieves continuous function variation of the output beam direction without resorting to deflection of an independently generated beam and in which there is realized a substantial improvement in the utilization of energy which has been stored by way of population inversion of an active medium.

In a preferred form of the present invention, the foregoing objects are achieved by the utilization of an electro-optically controllable directional filter means positioned within a cavity which is capable of supporting optical frequency oscillation. The cavity resonator is arranged to be omnidirectional over a predetermined angular range in the sense that a beam-like mode of light frequency oscillation may exist in any direction over that range. In a preferred form the omnidirectional cavity resonator comprises a pair of similar lenses, and a pair of planar reflectors with the reflectors being spaced apart a distance substantially corresponding to four times the focal length of one of the lenses. The lenses are positioned within the cavity between the two reflectors and spaced apart a distance equal to twice the common focal length so that each lens is spaced approximately a distance corresponding to its focal length from the nearest reflector and from the longitudinal center of the system.

The manner in which the foregoing objects are achieved together with other objects and features of this invention will be more clearly apparent from the following description when taken in accordance with the accompanying drawings throughout which like reference characters indicate like parts, which drawings form a part of this application and in which.

Figure 1:
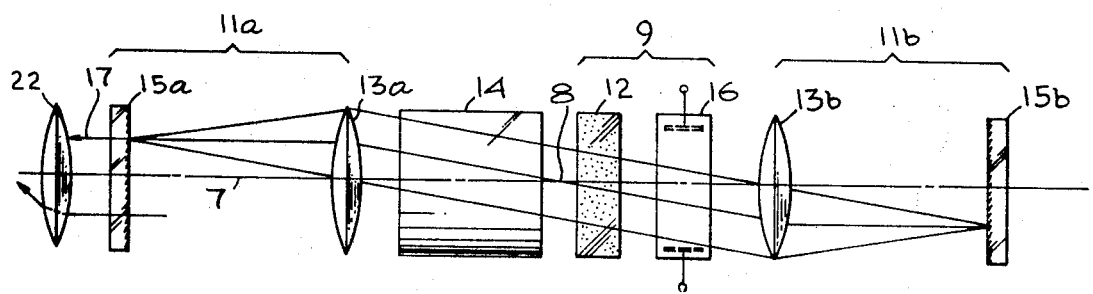
FIG. 1 is a diagrammatic illustration of one embodiment of a system in accordance with the invention.

Now referring to FIG. 1 the system comprises a light amplifying means in the form of a cylindrical ruby rod 14 which is disposed within an optical frequency resonant cavity. The apparatus departs from conventional practice in two major respects. Firstly, the optical resonator comprising components 11a and 11b is arranged to be omnidirectional over an appreciable angular range. More specifically, the resonator is comprised of two optical flats or reflectors 15a and 15b and a pair of lenses 13a and 13b which preferably are identical and which have a focal length equal to their respective spacings from the optically flat reflectors 15a and 15b.

Preferably the reflectors are positioned normal to the central axis 7 and facing one another from opposite ends of the axis. By positioning the lenses 13a and 13b so that they are separated by a distance equal to twice the common focal length a "walking beam" resonant mode of optical oscillation is obtained around the common center of symmetry, i.e., the center point 8 of the longitudinal axis 7. Preferably the end reflector 15b is made fully reflecting by provision of appropriate dielectric coatings on the inner surface thereof in accordance with a practice which is now well known in the art. The other end reflector 15a is similarly provided with dielectric layers which form a so-called dielectric mirror but is preferably constructed to be semi-transmitting so that an output laser beam may be propagated outwardly therefrom as indicated by the reference numeral 17. A lens 22 adjacent reflector 15a serves to recollimate the output beam and functions as an optical lever to magnify the output beam deflection angle.

Secondly, the arrangement illustrated in FIG. 1 departs from conventional practice in that there is disposed between the laser element 14 and the lens 13b a directional filter means 9. The provision of the direction determining or selecting filter means within the resonant cavity makes it possible to selectively restrict oscillation within the cavity to only one angular direction relative to the axis of the system. It should be understood that the directional filter means 9 may comprise any one of various arrangements which will become apparent to persons skilled in the art after they fully appreciate the concept of controlling angular oscillation within an omnidirectional resonant cavity. In a presently preferred form of the present invention, the directional filter 9 comprises a fixed birefringent element such as a calcite plate 12 and an adjacently positioned electro-optically controllable variably birefringent element, such as, for example, a conventional Kerr cell 16. A control signal is applied to the variable birefringent element 16 from a conventional control signal source (not shown) such as for example, a saw tooth generator or the like. By varying the voltage applied to the variably birefringent element 16 the angular direction along which the system has minimum attenuation (i.e., maximum gain) can be varied so that the angular direction of stimulated emission and laser beam generation is controlled.

The system of FIG. 1 is omnidirectional over an angular range corresponding to the solid angle subtended by the diameter of the lens 13a relative to the center point 8 of the system. That is, the angle of scan or angle through which the direction of the generated beam can be varied is limited only by the numerical aperture of the lenses 13a and 13b and by the diameter to length ratio of the laser rod 14. Except for the effect of the directional filter means 9 the system would oscillate to produce a laser beam in any diection over that angular range and would be angularly unpredictable and degenerate. With the directional filter means 9 in position as shown in FIG. 1 the system is no longer free to oscillate in any and all directions. Rather the birefringent characteristics of the elements 12 and 13 govern the angular direction along which oscillation is permitted at any particular time. The precise concepts which enable the directional filter means 9 to control the beam direction within the omnidirectional cavity have been considered in particular detail in the above mentioned copending application Ser. No. 343,623. Reference may be had to that copending application for a full explanation of the principles of phase retardation in birefringent materials and the manner in which those principles are used in apparatus such as the directional filter 9 to control the direction along which optical oscillation is permitted. For the purposes of the present invention it is enough to note (1) that a beam-like mode of oscillation is possible in any direction over a substantial angular range, (2) that spatial directional filters having a transmissivity which varies with angle can be realized, and (3) that by application of variable electrical control signals to the variable birefringent element 16 the system may be caused to have a preferred direction of light frequency oscillation, with that prefrred direction varying angularly as a function of the applied control signal magnitude.

Figure 2:
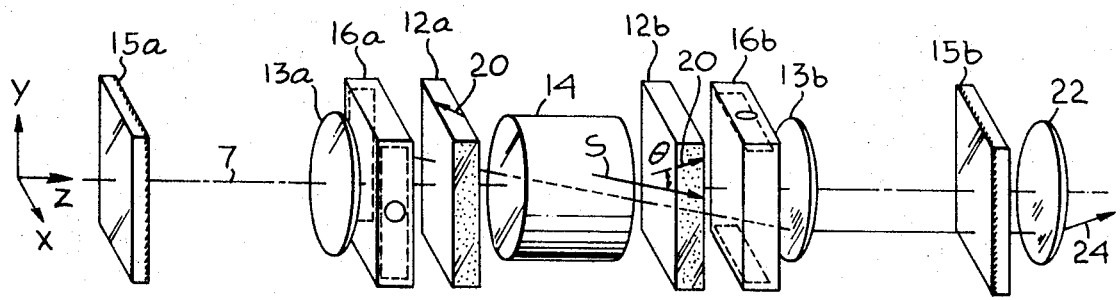
FIG. 2 is a perspective view of a further embodiment similar to that of FIG. 1 but including a second orthogonally oriented directional filter means for enabling two dimensional raster scanning.

It is to be noted that the variable filter means 9 of the apparatus of FIG. 1 would be operative to vary the preferred direction of oscillation in one plane only. That is, the output beam 17 can be scanned vertically from the bottom of the end mirror 15a to the top. That alone is a useful function since it enables generation of a beam which may be angularly scanned in a single plane. A further embodiment of the present invention which provides for biplanar scanning is illustrated in FIG. 2. With this arrangement, angular scanning throughout the solid angle of omnidirectionality is readily obtainable and thus the apparatus may be used to scan out a television-like raster of lines at the output end plate 15b. The system of FIG. 2 is generally similar to that of FIG. 1. Those parts of FIG. 2 which are, or may be identical to the components used in the apparatus of FIG. 1 have been designated by the same reference numerals and, therefore, will not be described in detail. The apparatus of FIG. 2 differs in that it includes first and second directional filters, with the first directional filter comprising calcite plate 12b and Kerr cell 16b and the second directional filter comprising a calcite plate 12a and adjacently disposed Kerr cell 16a. From consideration of FIG. 2, it may be observed that the second directional filter is oriented orthogonally relative to the first directional filter. That is, Kerr cell 16b of the first directional filter is positioned about the axis 7 so that its plates are parallel to the X-axis while the Kerr cell 16a of the second filter is rotationally displaced 90° so that its plates are parallel to the Y-axis. With this arrangement, the second directional filter 12a, 16a operates to vary the direction of maximum transmission angularly in the X–Z plane and the first directional filter 12b, 16b operates to control the direction of the generated beam in the Y–Z plane. For a full and complete understanding of the manner in which the above described systems achieve direction filtering and beam steering in response to electrical control signals, it is perhaps desirable to consider in some detail the phenomenon of birefringence as it applies to systems in accordance with the present invention. First, it is desirable to consider briefly the polarization characteristics of the coherent light emitted by laser elements such as the ruby rods 14 of FIGS. 1 and 2.

It is well known in the art that pink ruby of the type commonly used for lasers is an optically anisotropic material having a cross section $\sigma$ for absorption which varies as a function of the polarization of the impinging radiation. That is, a plane polarized ray passing through the ruby rod 14 at one specific polarization angle relative to the crystal structure will encounter a maximum absorption characteristic, and a plane polarized wave travelling in the same direction but polarized at a different angle will encounter a minimum absorption. Similarly, it is well known [1] that a pumped or population inverted ruby will have a minimum amplification or gain for plane polarized waves having a first angular orientation and a maximum gain for a second orientation. In a practical apparatus such as that illustrated in FIG. 1, the foregoing gain-verusus-polarization characteristic means that the ruby rod 14 tends to produce a dominant oscillatory wave which is plane polarized in the "preferred" (i.e., maximum gain) plane of the crystal structure of the ruby. Thus, if we assume oscillation between the reflectors 15a and 15b and along the central axis 7, it is evident that the ruby rod may be rotated about its longitudinal axis to orient the plane of polarization of the generated radiation to any desired angle.

Figure 3A:
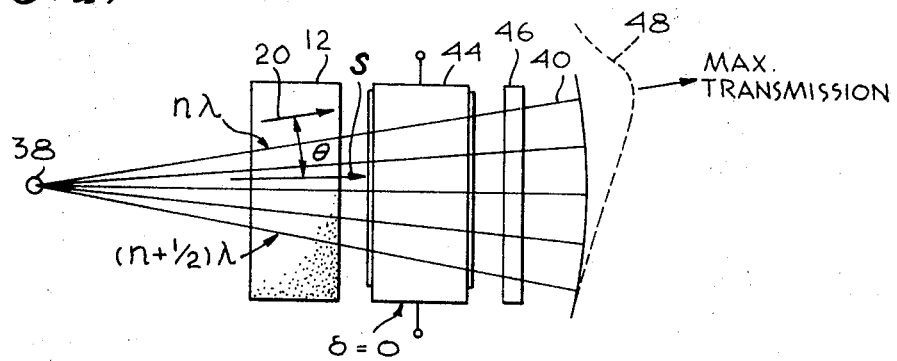
FIGS. 3a, 3b and 3c are optical diagrams illustrating the concepts involved in the operation of spatially distributed directional filters utilizing electrically variable optical elements.

Variation of the directional properties of a directional filter is illustrated in the sequence of diagrammatic illustrations 3a, 3b and 3c. As shown in FIG. 3a a plane polarized wave is indicated as originating at a point 38 representative of any point of spontaneous emission in the ruby rod 14 of the system of FIG. 2. This plane polarized wave passes through the fixed birefringence plate 12 and suffers a phase retardation of its extraordinary component which varies as a function of the angle between the ray and the optic axis 20 of the plate 12. That is, it is well known [2] that when a light ray passes through a uni-axial crystal such as plate 12, the phase difference between the ordinary component $E_o$ and the extraordinary component $E_e$ upon emerging is:

$$\delta = BL/\lambda = \frac{2\pi\rho}{\lambda}(n_e - n_o)\sin^2\theta \qquad (1)$$

where:

B is the difference of the refractive indexes for the particular direction of propagation, L is the average optical path length within the plate 12 of the ray in question, $\lambda$ is the wave length in air, $\delta$ is the resulting phase difference between the two components (i.e., the phase retardation of $E_e$ relative to $E_o$),

[1] See for example, a paper entitled "The Polarization of the Output From a Ruby Optical Maser" read by D. F. Nelson and R. J. Collins, at the Second International Conference on Quantum Electronics, Berkeley, March 1961, and reported in "Advances in Quantum Electronics," edited by J. R. Singer, Columbia University Press, New York, 1961.
[2] For example, see sections 14.4.3 and 14.4.4 of Born and Wolf, "Principles of Optics," Pergamon Press, New York, 1959.

$n_o$ and $n_e$ are the refractive indexes of the particular crystal material for the ordinary wave and the extraordinary wave respectively, $\rho$ is the polar distance physical path length of the ray in passing through the crystal plate 12, and $\theta$ is the angle which the wave normal S subtends relative to the optic axis 20 in passing through the crystal.

One particular ray 40 passes through the plate 12 parallel to the optic axis 20 and therefore the plate 12 appears isotropic to this particular ray. That is, in accordance with Equation 1, the angle $\theta$ is zero and the particular ray 40 suffers no relative phase retardation in passing through the plate 12. With the variable birefringer 44 de-energized so that it has a phase retardation equal to zero the particular ray 40 passes through the directional filter without any alteration of its polarization. An analyzer 46 is positioned across the light path, and rotationally oriented so that its optic axis is parallel to the direction of polarization of the original wave originating from the point 38. Thus, for the particular plane polarized ray 40 the analyzer 46 has substantially 100% transmissivity. Any ray having a different wave direction will be partially attenuated by the analyzer 46 due to the fact that it passes through the plate 12 anti-parallel to the optic axis 20 and suffers a phase retardation so that it is elliptically polarized when arriving at the analyzer 46. Thus the directional filter assembly illustrated diagrammatically in FIG. 3a has a transmissivity which varies as a function of incident ray angle. That angle-dependent transmissivity of the directional filter is graphically indicated by curve 48 in FIG. 3a.

Figure 3B:
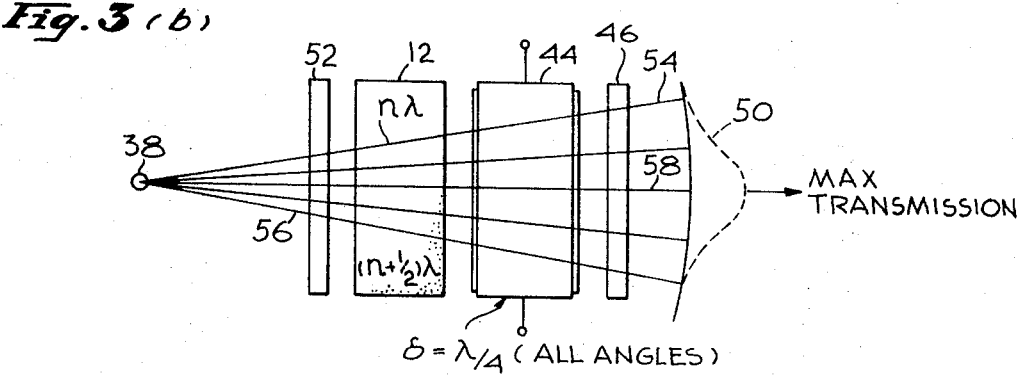

FIG. 3b illustrates a similar diagrammatic arrangement comprising the same fixed birefringer 12, variable birefringer 44 and analyzer 46. This illustrative directional filter differs from that of FIG. 3a in that it includes an initial polarizer 52 such as a Nicol or Glan prism positioned between the light source point 38 and the birefringer 12. The purpose of providing the polarizer 52 in this illustrative diagram is to demonstrate that the light emitting from point 38 need not be derived from a medium which has inherent polarizing characteristics (such as the ruby rod 14). Rather, the directional filter of FIG. 3b will operate with ordinary unpolarized light to provide angle dependent transmissivity. Here the light emitting from point 38 is assumed to be initially unpolarized. Polarizer 52 operates to reject all wave components except those which are polarized in a particular direction, say, for example, a polarization direction such that the electric vector vibrates in the direction of the plane of FIG. 3b. The now polarized wave passing from polarizer 52 and through the birefringer 12 suffers a phase retardation (or elliptical polarization) dependent upon the angle which a particular ray makes relative to the optic axis of the birefringer 12. For example, a ray in the direction indicated by line 54 suffers a phase retardation of $n$ wavelengths (i.e., $n\lambda$ radians), while a ray having the direction indicated by line 56 suffers a phase retardation of $(n+\frac{1}{2})\lambda$ radians, and all rays between the lines 54 and 56 suffer intermediate amounts of phase retardation. Specifically, a ray having the horizontal direction indicated by line 58 is phase retarded by $(n+\frac{1}{4})\lambda$ radians. Now, if the electro-optically variable birefringer element 44 is energized with a voltage sufficient to provide a phase retardation of $\frac{1}{4}$ wavelength for rays having any and all directions, it is evident that a ray propagated in the direction indicated by line 58 will be phase retarded by exactly $\pi$ radians, and providing that the analyzer 46 and polarizer 52 are oriented orthogonally (i.e., crossed-polarizers) this particular wave passes through the analyzer 46 without being attenuated. In contrast, a wave having the direction indicated by line 54 suffers a phase retardation $\delta = (n\frac{1}{4})\lambda$ in passing through the elements 12 and 44 and is therefore elliptically polarized upon arriving at the analyzer 46 so that it is appreciably attenuated thereby. Curve 50 indicates the transmissivity-versus-direction characteristics of the arrangement of FIG. 3b when the electro-optically variable birefringer 44 has a phase retardation of ¼ wavelength.

Figure 3C:
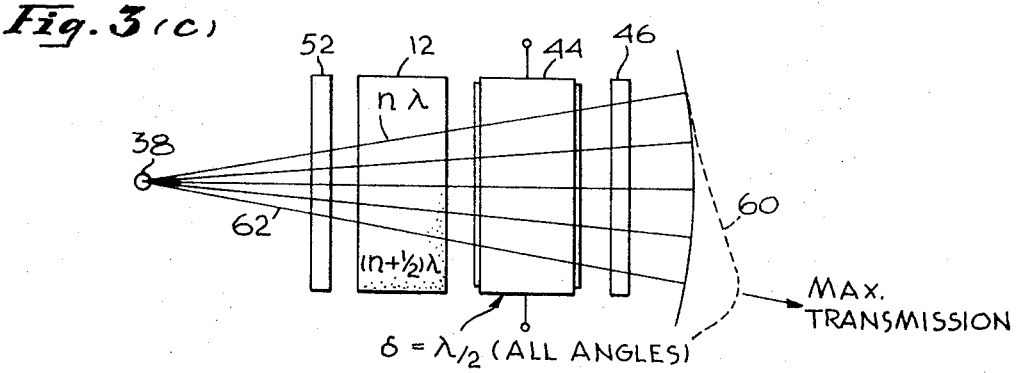

FIG. 3c illustrates an arrangement identical to that of FIG. 3b but with the electro-optically variable birefringer 44 being energized to provide a phase retardation of one-half wavelengths for all directions of wave propagation therethrough. By the same process of analysis as set forth above with reference to FIG. 3b it may be demonstrated that the arrangement of FIG. 3c has a transmission characteristic as indicated by the curve 60 with the direction of maximum transmissivity being that indicated by ray 62.

In summary, FIGS. 3a, 3b and 3c illustrate that the combination of a birefringent plate 12 and an electro-optically variable birefringent element 44 operates as a means for variably filtering or attenuating light as function of ray direction. When that combination of elements is disposed in a substantially omnidirectional resonant cavity in conjunction with an amplifying medium (such as a laser rod) the directional filter means 12, 44 inhibits laser oscillation from occurring in any direction except one specific direction determined by the contemporaneous value of the time variable electrical bias applied to the variable directional filter means.

Figure 4:
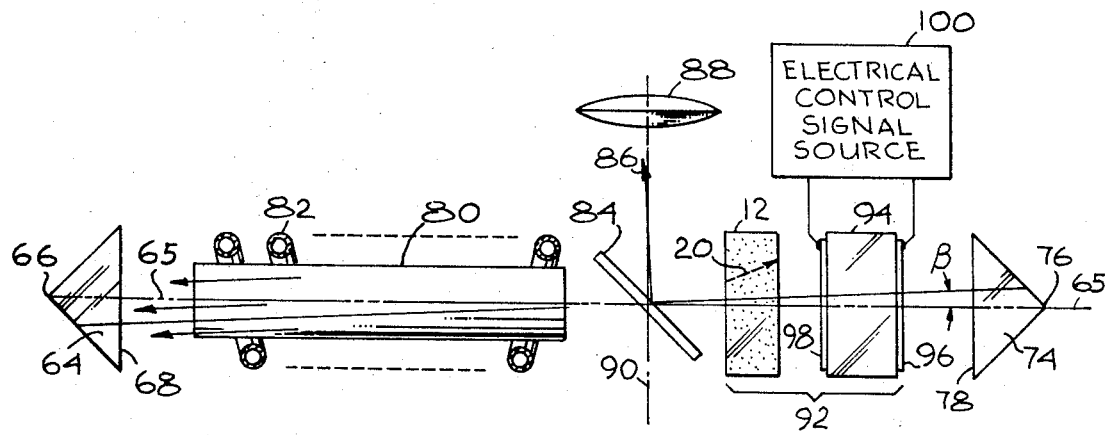
FIG. 4 is a cross-sectional view of a further embodiment of apparatus in accordance with the invention.

In FIG. 4, there is illustrated a further embodiment in accordance with the present invention which has the advantage that it avoids the use of refracting lenses within the optical cavity of the system. Here a partially omnidirectional optical cavity is formed by a pair of roof prisms 64 and 74 spaced apart at the opposite ends of the longitudinal axis 65 and oriented so that their hypotenuse faces 68 and 78 are parallel and facing one another. It is readily shown and new well known in the art that optical oscillation between a pair of roof prisms can occur in any direction throughout a substantial angular range with the angular range being limited only by beam "walk-off" considerations. That is, the optical frequency resonant cavity formed by the roof prisms 64 and 74, oriented with their ridge lines 66 and 76 parallel, is a partially omnidirectional cavity with the omnidirectionality extending through an angular range which is limited by the point at which its efficiency is lost by portions of the beam extending beyond the edges of the prisms. One prior art example of substantial omnidirectionality in a system using a roof prism is set forth in U.S. Pat. 1,913,795.

In accordance with the present invention an amplifying means in the form of a laser rod 80 is positioned within the omnidirectional cavity of the system of FIG. 4. The laser rod is preferably oriented so that the multiple reflection rays supported between the prisms extend through a major portion of the volume of the laser rod. In a preferred form the laser rod 80 is chromium doped corundum (pink ruby) and is peripherally surrounded by a helical pumping lamp 82 of the type now well known in the art. In the center of the system there is provided an output coupling means which in a preferred form is an optically flat glass plate 84 oriented at 45° with respect to the longitudinal axis 65 of the system. The glass plate 84 reflects a very small fraction (of the order of 1 or 2%) of the optical beam in the cavity outwardly along the direction indicated by the ray 86. In a preferred form, the system of FIG. 4 includes an optical levering means, such as a convergent lens 88 positioned above the plate 84 and with its central axis coincident with the vertical central axis 90 of the system. In addition, there is provided between the plate 84 and the end prism 74 a directional filter means 92 which includes a fixed birefringent plate 12 and a variable birefringent element 94. It will be understood that the directional filter 92 operates in accordance with the same principles and to the same purpose and effect as the directional filters discussed heretofore in connection with FIGS. 1, 2 and 3. That is, the directional filter 92 controllably determines the angle $\beta$ along which stimulated emission and optical oscillation is permitted to occur and operates to inhibit oscillation along other directions.

To emphasize that none of the various embodiments of the present invention is limited to Kerr effect electro-optical devices, the directional filter 92 of the apparatus of FIG. 4 is illustrated as comprising a variable birefringer 94 in the form of a Pockels effect device. For example, the variable birefringer 94 may comprise a crystal of ammonium dihydrogen phosphate or potassium dihydrogen phosphate with conductive coatings 96 and 98 applied to opposite faces thereof. Appropriate terminals are provided on the electrodes 96 and 98 and are connected by conventional in-leads to a source of control signals 100. It will be understood that a Kerr cell such as that described in connection with FIG. 1 may be used in place of the Pockels effect variable birefringer 94 or conversely the apparatus of FIGS. 1 and 2 may use Pockels effect variable birefringent elements as alternatives to the Kerr cells there illustrated.

Further, while the systems in accordance with the present invention have been described as incorporating Kerr cells or Pockels cells as the electro-optically variable birefringent elements it should be understood that the invention is not so restricted. Rather, substantially any device or material which exhibits variable birefringence as a function of an applied electrical or other control signal may be used for the element 16 of FIG. 1 and variable element 94 of FIG. 4. It is contemplated that quartz crystals may be used for these electro-optically variable elements. In such a case the electro-optic response is proportional to the dimension in the Z-axis direction of the crystal, which is the direction of light travel, and to the transverse electrostatic gradient. Other known crystalline materials exhibiting an electro-optic response to fields applied transversely to the direction of light travel may be used. Various alternative electro-optical materials which will be recognized as readily applicable to the systems of the present invention are disclosed, for example, in U.S. Pats. 2,811,898 issued Nov. 5, 1957, 2,766,659 issued Oct. 16, 1956, and 2,467,325 issued Apr. 12, 1949.

Further, while the apparatus of FIG. 4 has been illustrated for simplicity and clarity as comprising a single directional filter 92 it will be appreciated that beam direction control in the orthogonal plane is likewise intended and is readily achievable in accordance with the invention by providing a second identical directional filter (not shown), which is to be rotationally oriented orthogonally relative to the illustrated filter 92. Where beam direction control for two orthogonal planes is desired the cavity forming reflector elements 64 and 74 preferably take the form of cube corner reflectors, rather than simple roof prisms. Specifically in accordance with this alternative embodiment the elements 64 and 74 are right angled cube corner elements having three equi-angular sides of equal area and having a hypotenuse face 68 which is an equilateral triangle. The cube corner reflector 64 and 74 may be prisms but preferably are hollow cube corner mirror structures having dielectric mirror surfaces similar to the surfaces of the mirror elements 15a and 15b (FIG. 1). The concept of achieving beam directional control in both of two orthogonal planes has been discussed in particular detail heretofore in connection with the apparatus of FIG. 1, and therefore need not be described again, it being understood that various features of the apparatus of FIGS. 1 and 2 may be incorporated in the system of FIG. 4, and vice versa within the spirit and scope of the invention.

While the present invention has been shown in certain specific embodiments only, it will be obvious to those skilled in the art that it is not so limited but is susceptible of various changes and modifications without departing from the spirit and scope thereof.

I claim:

1. A laser system for generating an angularly dirigible light beam of coherent radiation comprising:
   (a) an active laser material including means for generating a coherent beam of light linearly polarized in a predetermined plane;
   (b) an optical frequency resonant cavity enclosing said laser material and including first and second substantially planar reflectors spaced from each other and from said laser material to define said cavity;
   (c) first and second beam converging lenses, each being positioned between said laser material and one of said reflectors for supporting a collimated beam of parallel light rays between said lenses controllable to form any one of a plurality of angles with a major optical axis of said laser material and within a predetermined range of angles for directing the coherent light beam in a desired direction and for returning the light beam through said laser material, each of said lenses being spaced by its focal length from its associated reflector, and said lenses being spaced from each other by their combined focal lengths so as to provide a real image of said beam on said reflectors; and
   (d) directional filter means disposed within said cavity for controlling at will the angle between said light beam and said major axis and thereby the direction of said light beam with respect to said major optical axis.

2. A laser system as defined in claim 1 wherein said laser material is of crystalline form having a crystalline structure exhibiting dichroism sufficient to generate a coherent beam of light being linearly polarized in a predetermined direction.

3. A laser system as defined in claim 1 wherein said directional filter means comprises a calcite plate having a predetermined degree of birefringence, and wherein said electro-optically active substance has a degree of birefringence continuously variable in accordance with the electrical stress applied thereto.

4. A laser system for generating an angularly dirigible light beam of coherent radiation comprising:
   (a) an active laser material including means for generating a coherent beam of light-frequency radiation being linearly polarized in a predetermined plane;
   (b) an optical frequency resonant cavity enclosing said laser material and having a predetermined axis, said resonant cavity being capable of propagating light through said laser material within a predetermined range of angular directions, said cavity including a first and a second roof prism serving as a reflector and positioned at opposite ends of said laser material and disposed to return a parallel beam of radiation impinging thereon back through said laser material;
   (c) directional filter means disposed within said cavity for continuously and variably controlling the direction and hence the angle between said parallel light beam and said predetermined axis for directing said light beam at will in a desired direction within said range of angular direction; and
   (d) output coupling means disposed within said cavity for recovering said light beam of uniform intensity and having a controlled direction.

5. A laser system for generating an angularly dirigible light beam of coherent radiation comprising:
   (a) an active laser material including means for generating a coherent beam of light-frequency radiation being linearly polarized in a predetermined plane;
   (b) an optical frequency resonant cavity enclosing said laser material and having a predetermined axis, said resonant cavity being capable of propagating light through said laser material within a predetermined range of angular directions, said cavity including a first and a second right-angled, cube corner reflector and positioned at opposite ends of said laser material and disposed to return a parallel beam of radiation impinging thereon back through said laser material;
   (c) directional filter means disposed within said cavity for continuously and variably controlling the direction and hence the angle between said parallel light beam and said predetermined axis for directing said light beam at will in a desired direction within said range of angular direction; and
   (d) output coupling means disposed within said cavity for recovering said light beam of uniform intensity and having a controlled direction.

References Cited

UNITED STATES PATENTS

| 3,229,223 | 1/1966 | Miller | 350—150 |
| 3,440,561 | 4/1969 | Pole et al. | 331—94.5 |

FOREIGN PATENTS

| 1,026,596 | 4/1963 | Great Britain. |

OTHER REFERENCES

Conjugate-Concentric Laser Resonator, R. V. Pole, Journal of the Optical Society of America, vol. 55, No. 3, pp. 254–260.

"A Sharp-Focusing Schlieren System," Miller et al., Photographic Engineering, vol. I, October 1950, pp. 119, 120.

RONALD L. WIBERT, Primary Examiner

V. P. McGRAW, Assistant Examiner

U.S. Cl. X.R.

350—150, 160